US009126300B2

(12) United States Patent
Nishimura et al.

(10) Patent No.: US 9,126,300 B2
(45) Date of Patent: Sep. 8, 2015

(54) MACHINE TOOL (75) Inventors: Kohei Nishimura, Niwa-Gun (JP); Kiyoshi Yoshino, Niwa-Gun (JP); Hajimu Ishii, Niwa-Gun (JP); Akihide Hamaguchi, Niwa-Gun (JP); Norikazu Suzuki, Nagoya (JP); Eiji Shamoto, Nagoya (JP)

(73) Assignees: Okuma Corporation, Niwa-Gun (JP); National University Corporation Nagoya University, Nagoya-Shi (JP)

( * ) Notice: Subject to any disclaimer, the term of this patent is extended or adjusted under 35 U.S.C. 154(b) by 986 days.

(21) Appl. No.: 13/270,559

(22) Filed: Oct. 11, 2011

(65) Prior Publication Data

US 2012/0109360 A1 May 3, 2012

(30) Foreign Application Priority Data

Oct. 27, 2010 (JP) .................................. 2010-241137

(51) Int. Cl.
*B23Q 15/08* (2006.01)
*B23Q 11/00* (2006.01)
*B23Q 17/12* (2006.01)

(52) U.S. Cl.
CPC ........ *B23Q 11/0032* (2013.01); *B23Q 11/0039* (2013.01); *B23Q 15/08* (2013.01); *B23Q 17/12* (2013.01); *Y10T 409/304312* (2015.01); *Y10T 409/306832* (2015.01); *Y10T 409/307224* (2015.01)

(58) Field of Classification Search
CPC .... B23Q 11/0039; B23Q 15/08; B23Q 15/12; B23Q 17/0976; B23Q 17/0974; B23Q 17/10; B23Q 17/12

USPC ........ 408/8, 9, 6; 409/141, 80, 186, 187, 193, 409/194
See application file for complete search history.

(56) References Cited

U.S. PATENT DOCUMENTS

| 2,839,711 | A  | * | 6/1958  | Tripp ............................. 318/569 |
| 7,341,410 | B2 | * | 3/2008  | Hill et al. ...................... 409/234 |
| 2006/0251484 | A1 | * | 11/2006 | Yoshida et al. ............... 409/131 |

(Continued)

FOREIGN PATENT DOCUMENTS

JP   49-105277 A1   10/1974
JP   11-129144 A1    5/1999

(Continued)

OTHER PUBLICATIONS

Japanese Office Action (Application No. 2010-241137) dated Mar. 24, 2014.

*Primary Examiner* — Sunil K Singh
*Assistant Examiner* — Alan Snyder
(74) *Attorney, Agent, or Firm* — Burr & Brown, PLLC (57) ABSTRACT

In a machine tool which includes a rotary shaft configured to allow a tool or a workpiece to be attached thereto, a driving unit for causing the rotary shaft to rotate is regulated to change a rotation speed of the rotary shaft in such a manner that the rotation speed oscillates with a given amplitude and a given period with respect to a given mean rotation speed, so that chatter vibrations can be suppressed. A parameter display control unit configured to cause a display device to display parameter information related to predetermined parameters for changing at least one of the mean rotation speed, the amplitude and the period is provided so that the parameters can be changed based upon the parameter information displayed in the display device.

5 Claims, 4 Drawing Sheets (56) References Cited

U.S. PATENT DOCUMENTS

2008/0058982 A1* 3/2008 Gray .............................. 700/159
2009/0030545 A1* 1/2009 Masuya et al. ................ 700/175
2010/0034609 A1* 2/2010 Doppenberg ................. 409/131
2011/0222980 A1* 9/2011 Kuo et al. ...................... 409/80

FOREIGN PATENT DOCUMENTS

| JP | 2000-126991 A1 | 5/2000 |
| JP | 2003-202910 A1 | 7/2003 |
| JP | 2005-144580 A1 | 6/2005 |

* cited by examiner

MACHINE TOOL

BACKGROUND OF INVENTION

This application claims the benefit of Japanese Patent Application Number 2010-241137 filed on Oct. 27, 2010, the entirety of which is incorporated by reference.

TECHNICAL FIELD

The present invention relates generally to a machine tool which performs a machining operation on a workpiece with a tool while rotating the tool or the workpiece.

BACKGROUND ART

A machine tool in which a tool, for example, is rotated to cut a surface of a workpiece may have chatter vibrations produced during its cutting operation for some reasons such as a low rigidity of the tool, or the like. As a method for suppressing chatter vibrations, a method of periodically changing the rotation speed of the main spindle within a predetermined range (amplitude) is known in the art, as described in Japanese Patent Application Laid-Open Publications 49-105277 and 2000-126991.

Conventionally, however, the amplitude and period of a periodical change (oscillation) in the rotation speed of the main spindle used to be determined empirically by an operator. This means that an operator should be sufficiently experienced in determination for effectively suppressing chatter vibrations. With the existing method as mentioned above, it is very difficult for an unexperienced operator to achieve satisfactory suppression of chatter vibrations, and an undesirable reduction in the yields of machined products is unavoidable, as the case may be.

There is a need to provide a machine tool with which even a less-experienced operator can easily achieve effective suppression of chatter vibrations and yield enhancement can be expected.

The present invention has been made in an attempt to address the need and eliminate the aforementioned disadvantages, and illustrative, non-limiting embodiments of the present invention overcome the above disadvantages and other disadvantages not described above.

SUMMARY OF INVENTION (1) According to an aspect of the present invention, a machine tool with a chatter vibration suppressing mechanism is provided which comprises a rotary shaft configured to allow a tool or a workpiece to be attached thereto, and a driving unit connected to the rotary shaft to cause the rotary shaft to rotate. The driving unit is regulated to change a rotation speed of the rotary shaft in such a manner that the rotation speed oscillates with a given amplitude and a given period with reference to a given mean rotation speed. Predetermined parameters are allowed to be changed to thereby change at least one of the mean rotation speed, the amplitude and the period. The machine tool further comprises a display device and a parameter display control unit configured to cause the display device to display parameter information that is information related to the parameters, to allow the parameters to be changed based upon the parameter information displayed in the display device.

(2) In the machine tool configured as described in (1) above, the parameter information displayed in the display device may include at least one of: (i) a value or a range of values of a parameter effective against regenerative chatter vibrations; and (ii) a value or a range of values of a parameter ineffective against the regenerative chatter vibrations.

(3) In the machine tool configured as described in (1) or (2) above, the parameter information displayed in the display device may include a range of values of a parameter according to which the driving unit is unable to be regulated.

(4) In the above configuration (1), with or without the additional feature (2) and/or (3), the predetermined parameters may include the amplitude and the period.

(5) In the above configuration (1), with or without the additional features (2) and/or (3), the predetermined parameters may include: (a) one of the amplitude and the period; and (b) at least one of an angular acceleration of the rotary shaft, a torque of the rotary shaft, an amount of electric power supplied to the driving unit, a rate of change obtained by dividing the amplitude by the period, and the mean rotation speed.

According to the configuration (1) as above, the mean rotation speed is a reference rotation speed with respect to which the rotation speed oscillates with a given amplitude and a given period.

With the configurations described above, various advantageous effects may be expected as follows.

According to the aspect of the present invention, as mentioned above in (1), the machine tool comprises the display unit and the parameter display control unit configured to cause the display device to display parameter information, and the parameters can be changed based upon the parameter information displayed in the display device. Therefore, with this machine tool, even if an operator is little experienced, the suppression of chatter vibrations can be achieved more effectively than with any existing machine tool, and the yields of machined products can be enhanced accordingly.

With one of the configurations described above in (2) in which the parameter display control unit can cause the display device to display, as information related to the parameters, a value or a range of values of each parameter effective against regenerative chatter vibrations, and/or a value or a range of values of a parameter ineffective against the regenerative chatter vibrations, even a less-experienced operator can achieve effective suppression of chatter vibrations with increased ease and reliability.

With the configuration (3) described above, the parameter display control unit can cause the display device to display, as information related to the parameters, a range of values of a parameter according to which the driving unit is unable to be regulated. Accordingly, it is possible to prevent an undesirable situation in which, for example, an operator inputs a value requiring a torque of the rotary shaft in excess of its maximum value, the input value thus becomes deemed invalid, and the machining operation proceeds without necessary changes which should be effected in the amplitude or the period of oscillation of the rotation speed of the rotary shaft, with the result that the chatter vibrations cannot be suppressed. Consequently, with this configuration, the chatter vibrations can be suppressed with higher reliability.

With the configurations described above in (4) and (5), in which the parameters include the amplitude and the period, or one of the amplitude and the period as well as at least one of an angular acceleration of the rotary shaft, a torque of the rotary shaft, an amount of electric power supplied to the driving unit, a rate of change obtained by dividing the amplitude by the period, and the mean rotation speed, the amplitude and the period of oscillation of the rotation speed of the rotary shaft can be changed with increased ease.

BRIEF DESCRIPTION OF DRAWINGS

The above aspect, other advantages and further features of the present invention will become more apparent by describing in detail illustrative, non-limiting embodiments thereof with reference to the accompanying drawings.

DETAILED DESCRIPTION OF THE INVENTION

A machine tool according to one embodiment of the present invention will be described in detail with reference to the drawings.

Figure 1:
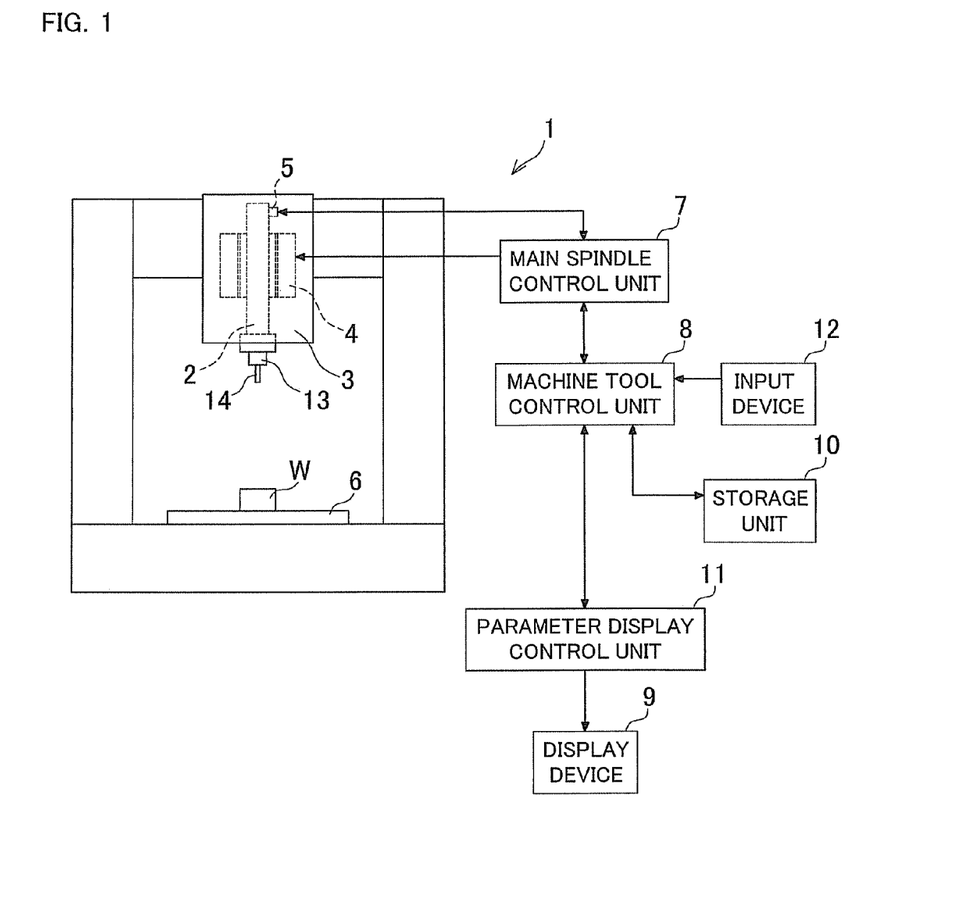
FIG. 1 is a schematic block diagram of a machining center as one example of a machine tool.

A machining center 1 as one example of a machine tool includes a main spindle 2 as an example of a rotary shaft to which a tool 14 is installable through a holder 13. The machining center 1 further includes a spindle head 3 in which the main spindle 2 and several other components such as a motor 4 and an encoder 5 are housed. The main spindle 2 is rotatably supported in the spindle head 3, and the motor 4 is configured to cause the main spindle 2 to rotate. The encoder 5 is configured to detect the rotation speed of the main spindle 2 or the motor 4. The machine tool 1 also includes a table 6 disposed in a position opposite to the spindle head 3 and configured to allow a workpiece W to be placed thereon.

A main spindle control unit 7 configured to control the rotation speed of the main spindle 2 and to regulate an amount of electric power supplied to the motor 4 is electrically connected to the motor 4 and the encoder 5. A machine tool control unit 8 configured to control an entire operation (behavior) of the machining center 1 is connected to the main spindle control unit 7, as well as to a storage unit 10, a parameter display control unit 11 and an input device 12. The storage unit 10 is configured to store a machining program. The parameter display control unit 11 includes a display device 9 which will be described later. The input device 12 is configured to receive instructions to change the rotation speed or the like to the machine tool control unit 8.

In this machine tool (machining center) 1, when the machine tool control unit 8 receives instructions to start a machining operation through the input device 12, a machining program stored in the storage unit 10 is read out therefrom to execute predetermined operations which include supplying electric power to the motor 4 to cause the main spindle 2 to start rotating, and changing a rotation speed of the rotary shaft in such a manner that the rotation speed oscillates with a given amplitude and a given period with reference to a given mean rotation speed (rotation speed S in FIG. 4), under control of the main spindle control unit 7, so that a surface or the like of a workpiece W is cut and processed. When chatter vibrations occur, the operator may change predetermined parameters (e.g., the amplitude and the period, in this embodiment) using the input device 12 based on information related to the parameters (for details, see below) displayed in the display device 9 to thereby change the amplitude and the period of oscillation of the rotation speed of the main spindle 2. Accordingly, the rotation speed of the main spindle 2 oscillates with an amplitude and a period in accordance with the values of the parameters inputted (changed) by the operator, so that chatter vibrations can be suppressed. In the mean time, the machine tool control unit 8 stores the values of the parameters effective for suppression of chatter vibrations and/or the amplitude and the period given in accordance with the values of the parameters, into the storage unit 10. In the future machining operation, from the next time onward, the rotation speed of the main spindle 2 is caused to oscillate, from the beginning, with the amplitude and the period stored in the storage unit 10 (in cases where only the values of the parameters are stored therein, the amplitude and the period may be calculated from the values of the stored parameters).

Figure 2:
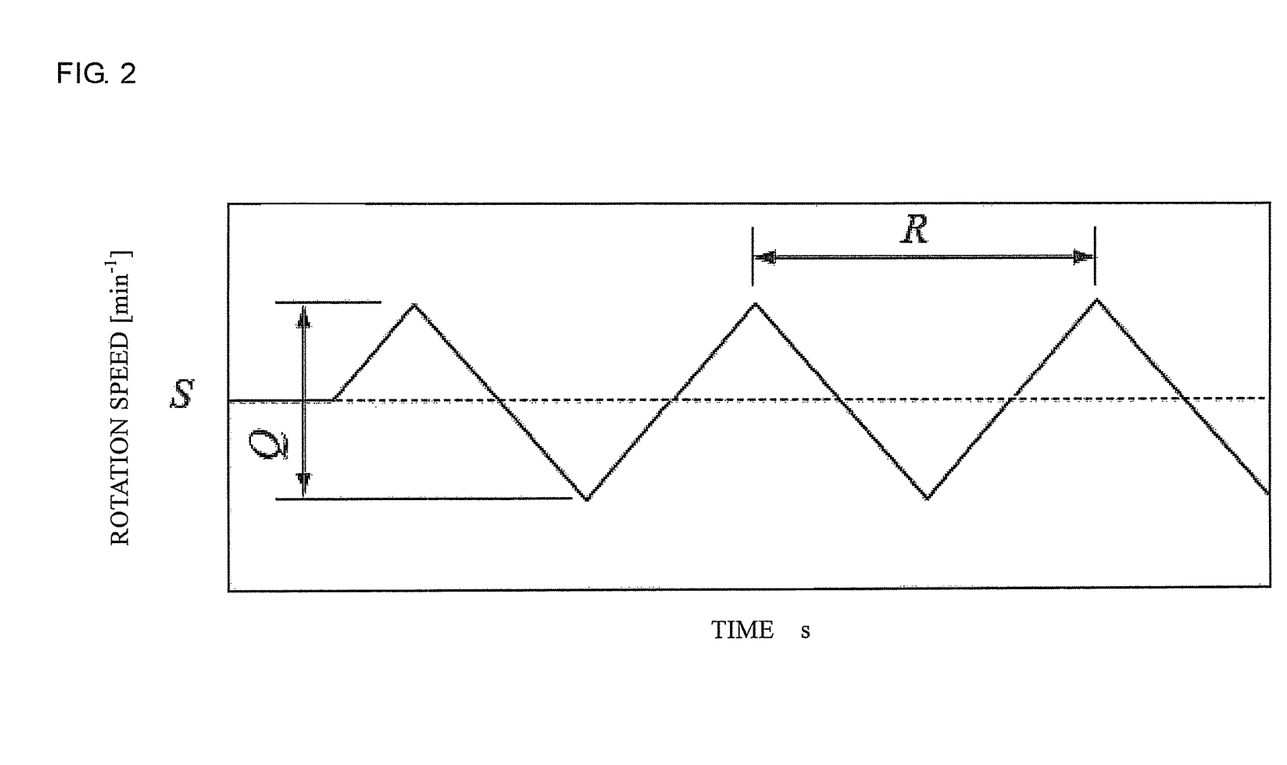
FIG. 2 is a schematic diagram graphically showing that a rotation speed of a main spindle oscillates with a given amplitude and a given period.

Oscillation generated by the main spindle control unit 7 in the rotation speed of the main spindle 2 may be represented, for example, as shown in FIG. 2 in which the rotation speed oscillates with amplitude Q and period R. Alternatively, the oscillation in the rotation speed may not necessarily be in the form of a triangular wave as shown in FIG. 2, but may be in the form of a sine wave or a trapezoidal wave, instead. As the parameters which can be changed to change the amplitude Q and the period R of oscillation of the rotation speed of the main spindle 2, the amplitude Q and the period R may be adopted, and other variables may also be adopted as the parameters. For example, it is noted that the following simple equation (1) is established:

$$Q = \frac{1500}{\pi S J}(T - T_c)R \qquad (1)$$

Q: Amplitude of oscillation of rotation speed [%]
R: Period of oscillation of rotation speed [s]
S: Rotation speed of main spindle [min$^{-1}$]
J: Inertia of rotating body [kgm$^2$]
T: Main spindle torque [Nm]
Tc: Cutting torque [Nm]

where Q is a value obtained by dividing the amplitude of the oscillating rotation speed by a mean rotation speed, R is a period of oscillation, and J is an inertia. Accordingly, the main spindle torque T (torque of the main spindle 2) may be substituted for the period R and adopted in combination with the amplitude Q as the predetermined parameters. That is, the machining center 1 may be configured such that the amplitude Q and the period R of oscillation of the rotation speed of the main spindle 2 is rendered changeable by allowing the amplitude Q and the main spindle torque T to be changed through the input device 12. The inertia J in the formula (1) is a value determined by the types of the main spindle 2, the holder 13 and the tool 14, or other factors.

It is also noted that relationship between the main spindle torque T and the main spindle angular acceleration (angular acceleration of the main spindle 2) is represented by the following formula (2), and thus the main spindle angular acceleration may be substituted for the main spindle torque T and adopted in combination with the amplitude Q as the predetermined parameters. Furthermore, the relationship between the main spindle torque T and the electric power supplied to the motor 4 is represented by the following formula (3), and thus the electric power supplied to the motor 4 may be substituted for the main spindle torque T and adopted in combination with the amplitude Q as the predetermined parameters.

$$\dot{\omega} = \frac{(T - T_c)}{J} \quad (2)$$

$\dot{\omega}$: Angular acceleration of main spindle [rad/s²]

$$P = \frac{\pi S}{30} T \quad (3)$$

P: Electric power supply [w]

Hereafter, some examples of display representation in the display device 9 created by the parameter display control unit 11 will be described with reference to FIGS. 3 and 4.

Figure 3:
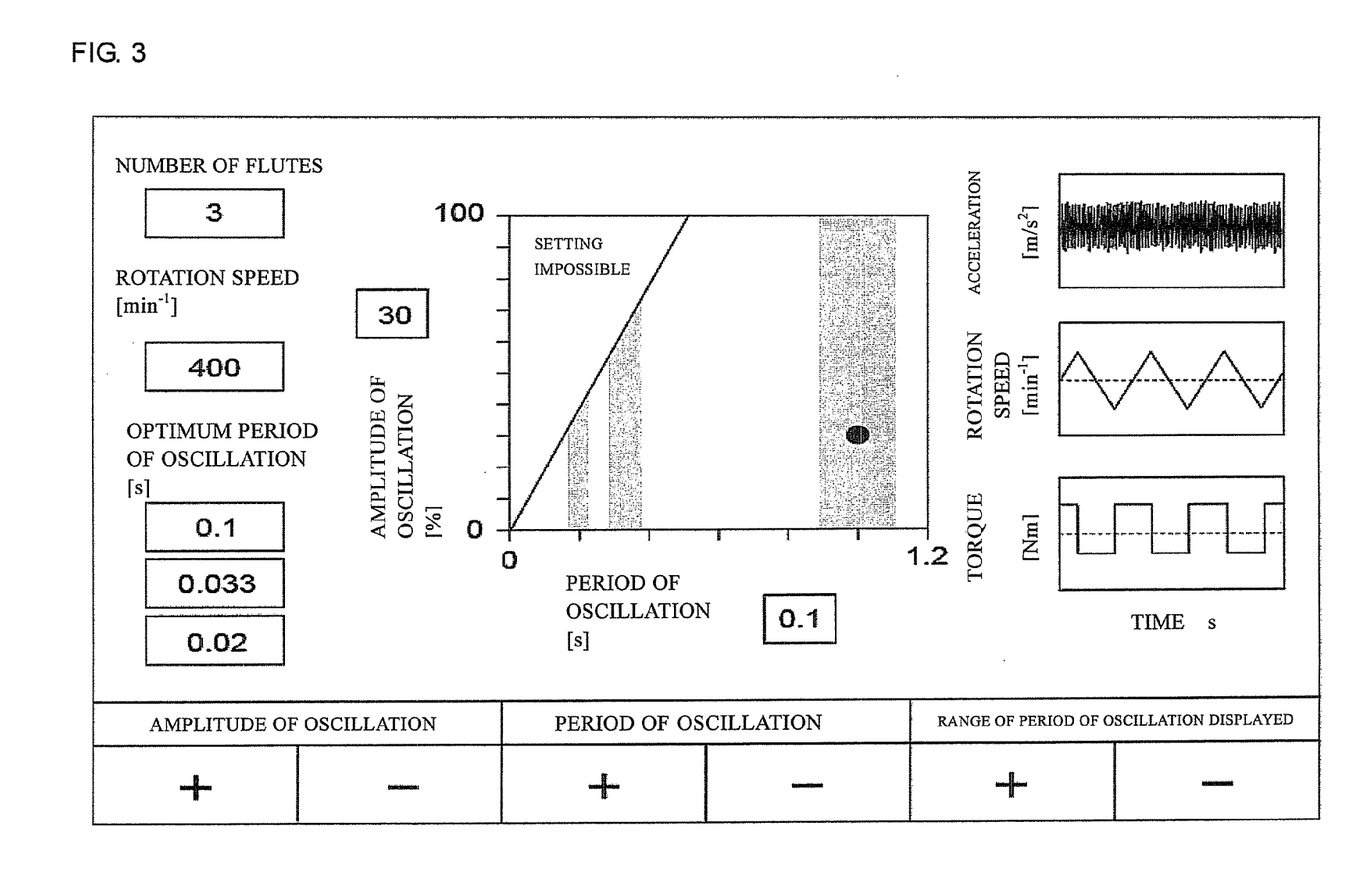
FIG. 3 is a schematic diagram of one example of display representation of information related to parameters and the like in a display device.
Figure 4:
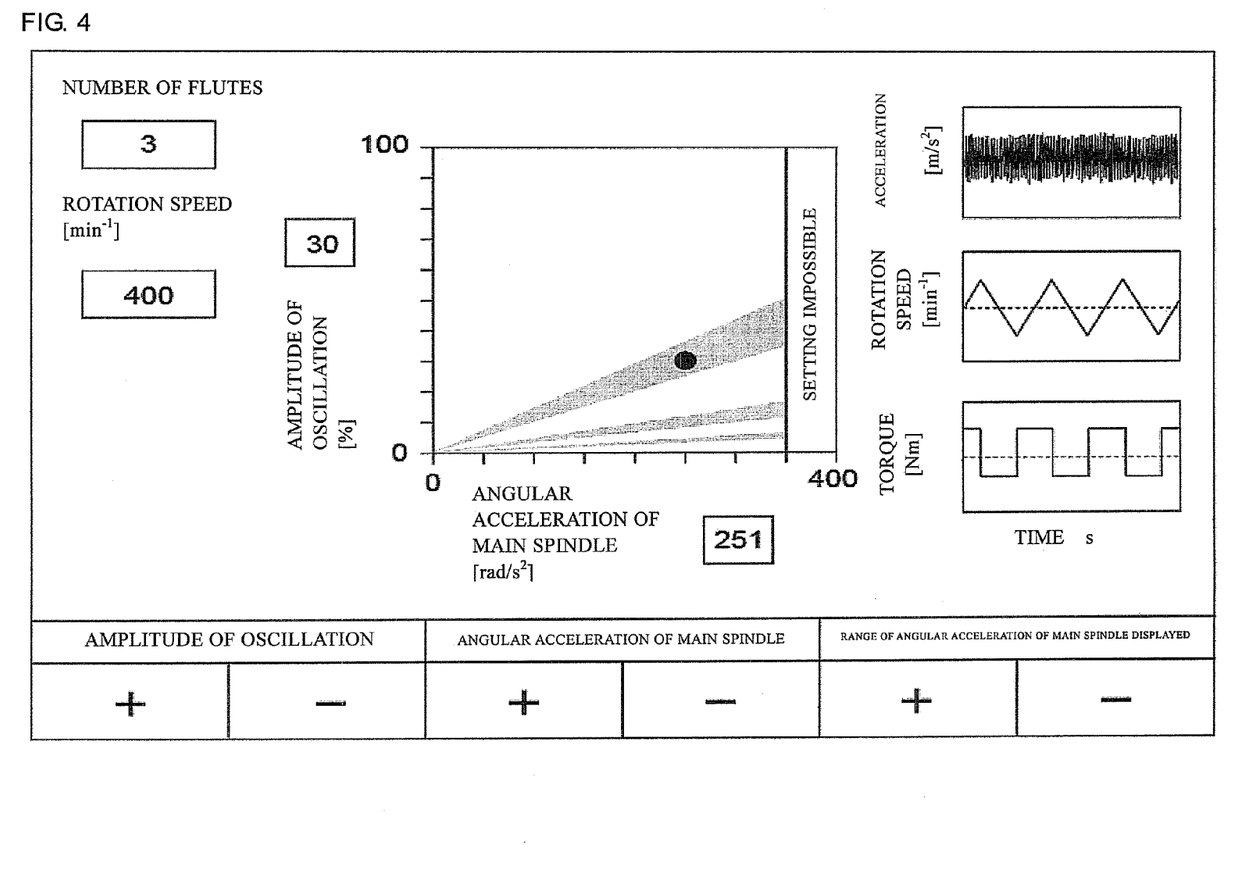
FIG. 4 is a schematic diagram of a modified example of display representation of information related to parameters and the like in the display device.

When the main spindle 2 is rotated to start the machining operation, machining information and parameter information are displayed in the display device 9, as shown in FIG. 3. The parameter information is information related to parameters for suppressing chatter vibrations (information indicative of values of parameters rendered changeable or values suggested for better choice). In the exemplary display representation shown in FIG. 3, the machining information displayed on the right side includes information on oscillation in the rotation speed of the main spindle 2 ("ROTATION SPEED" in FIG. 3), information on variation in the torque of the main spindle 2 ("TORQUE" in FIG. 3), and information on vibration acceleration obtained by a vibration sensor (not shown) detecting vibrations occurring at the main spindle 2 ("ACCELERATION" in FIG. 3). The machining information which is also displayed on the left side includes information on the number of flutes of the tool 14 used, and information on mean rotation speed of the main spindle 2 during the machining operation.

On the other hand, in the exemplary display representation shown in FIG. 3, the parameters are predetermined to be the amplitude Q and the period R of oscillation of the rotation speed (i.e., the amplitude Q and the period R are changeable through the input device 12). In FIG. 3, as the parameter information, a current setting (i.e., currently set amplitude and period) is plotted on a plane rectangular coordinate having an ordinate and an abscissa indicating the amplitude and the period, respectively, as represented by a filled circle in FIG. 3. It is known that effective suppression of the so-called regenerative chatter vibrations is achieved only in some limited values of the period, and the effective periods and the ineffective periods are represented by the following formulas (4) and (5), respectively. Accordingly, in the example of FIG. 3, periods obtained from the formula (4) and predetermined ranges of which mean values are set at the obtained periods (i.e., each ranging from the obtained value minus a predetermined value to the obtained value plus the predetermined value) are set as ranges of the periods effective for suppressing chatter vibrations, and indicated by putting a distinctive color thereto in the plane rectangular coordinate.

$$\text{Main spindle oscillation period effective for suppressing chatter vibration (s)} = \frac{120}{m(2n-1)N} \quad (4)$$

$$\text{Main spindle oscillation period ineffective for suppressing chatter vibration (s)} = \frac{60}{mnN} \quad (5)$$

m: Number of flutes
n: Integer
N: Mean rotation speed of main spindle [min⁻¹]

Candidates of mean rotation speeds effective for the suppression of chatter vibrations may be obtained from the formula (4) with a set period, and a predetermined number of the obtained candidates may also be shown sequentially from the candidate closest to the current rotation speed, as the parameter information. In this way, as well, the mean rotation speed may be changed by the operator through the input device 12 (for example, the mean rotation speed with reference of which the rotation speed oscillates is changed with the amplitude and the period retained unchanged).

Alternatively or additionally, a plane rectangular coordinate having an ordinate and an abscissa indicating the period R and the mean rotation speed N, respectively, may be provided, on which a current setting (i.e., currently set period and mean rotation speed) is plotted. Accordingly, a value or a range of values of the period R and the mean rotation speed N effective for suppressing chatter vibrations and/or a value or a range of values of the period R and the mean rotation speed N ineffective for suppressing the chatter vibrations may be indicated by putting a distinctive color thereto in the plane rectangular coordinate.

Meanwhile, it is known that an excessive supply of electric power to the motor 4 would cause the motor 4 to overheat or otherwise damage the motor 4. With this in view, in order to avoid such an undesired situation, the machine tool control unit 8 is configured to limit the maximum value of the torque of the main spindle 2. Accordingly, there are cases where the amplitude Q of oscillation of the rotation speed of the main spindle 2 could not be changed to a greater value or the period R of oscillation of the rotation speed of the main spindle 2 could not be changed to a smaller value. To be more specific, the ranges within which the amplitude Q and the period R can be changed are limited by the following formula (6) derived from the formula (1) mentioned above. Therefore, the parameter display control unit 11 is configured to explicitly display ranges of the amplitudes and the periods which fail to satisfy the formula (6), as the parameter information, in the plane rectangular coordinate (region labeled "SETTING IMPOSSIBLE" in FIG. 3), so that an operator is prohibited from inputting any values of parameters in the ranges which fail to satisfy the formula (6).

$$Q \leq \frac{1500}{\pi S J}(T_{max} - T_c)R \quad (6)$$

$T_{max}$: Maximum value of the torque of the main spindle [Nm]

It is to be understood that the inertia J in the formula (6) may be calculated from the material or shape of the holder 13 or the tool 14, or from the formula (1) with the main spindle torque T, the amplitude Q and the period R under no-load operation (idle running). The cutting torque Tc may be calculated from the shape of the tool 14, the specific cutting resistance, and cutting conditions, or determined by subtracting the main shaft torque under no-load operation from the main spindle torque under actual operation of cutting the workpiece W.

Although the parameters shown in the exemplary display representation of FIG. 3 are the amplitude Q and the period R, the parameters to be predetermined may not be limited thereto. For example, a display representation in the display device 9 in which an amplitude Q and an angular acceleration are adopted as the parameters is shown in FIG. 4. In the example of FIG. 4 as well, machining information and parameter information are displayed in the display device 9, and the machining information shown in the example of FIG. 4 is substantially the same as that which is shown in the example of FIG. 3. On the other hand, as the parameter information, a current setting (i.e., currently set amplitude and angular acceleration) is plotted on a plane rectangular coordinate having an ordinate and an abscissa indicating the amplitude Q and the angular acceleration, respectively, as represented by a filled circle in FIG. 4. Furthermore, it is known that the amplitude Q, the period R and the angular acceleration has a relationship as expressed by the following formula (7). By substitution of the formula (4) mentioned above into the formula (7), the relationship between the amplitude Q and the angular acceleration which produces an effect of suppressing regenerative chatter vibrations is obtained as expressed by the following formula (8). Therefore, in the example of the FIG. 4, periods obtained from the formula (4) and predetermined ranges of which mean values are set at the obtained periods, respectively (i.e., each ranging from the obtained value minus a predetermined value to the obtained value plus the predetermined value) are substituted into the following formula (8) to obtain ranges of the amplitudes and the angular accelerations effective for suppressing chatter vibrations, which ranges are indicated by putting a distinctive color thereto in the plane rectangular coordinate.

$$Q = \frac{1500}{\pi S} R\dot{\omega} \quad (7)$$

$\dot{\omega}$: Angular acceleration of main spindle [rad/s$^2$]

$$Q = \frac{1500 \times 120}{\pi S^2 m(2n-1)} \dot{\omega} \quad (8)$$

Since the maximum value of the torque of the main spindle 2 is limited, the range within which the angular acceleration can be changed is limited by the following formula (9) derived from the formula (2) mentioned above. Accordingly, the parameter display control unit 11 is configured to explicitly display the range of the angular acceleration which fails to satisfy the formula (9), as the parameter information, in the plane rectangular coordinate (region labeled "SETTING IMPOSSIBLE" in FIG. 4), so that an operator is prohibited from inputting any values of parameters in the range which fails to satisfy the formula (9).

$$\dot{\omega} \le \frac{T_{max} - T_c}{J} \quad (9)$$

It is appreciated that any other variables may be adopted as the parameters for changing the amplitude Q and the period R of oscillation of the rotation speed. For example, instead of the period R and the angular acceleration, the main spindle torque or the electric power supplied to the motor 4 may be adopted in combination with the amplitude Q as the parameters. In these embodiments, the parameter display control unit 11 may be configured to display parameter information, for example, by plotting a variety of information on a plane rectangular coordinate having an ordinate and an abscissa indicating the amplitude Q and the main spindle torque, respectively. Alternatively, the angular acceleration, the main spindle torque and the electric power supply may be adopted in combination with the period R. Moreover, a rate of change may be obtained by dividing the amplitude Q by the period R, so that the rate of change and the amplitude Q may be adopted as the parameters or the rate of change and the period R may be adopted as the parameters. On the other hand, unlike the examples of FIGS. 3 and 4 in which only the ranges of values of the parameters effective for suppressing regenerative chatter vibrations are displayed, ranges of values of the parameters ineffective for suppressing regenerative chatter vibrations, which can be obtained from the formula (5) mentioned above, may also be displayed as the parameter information.

With the machining center 1 configured according to the present embodiment, predetermined parameters are allowed to be changed when chatter vibrations occur, whereby the rotation speed of the main spindle 2 is changed in such a manner that the rotation speed oscillates with an amplitude Q and a period R adjusted in accordance with the changed parameters, and information related to the predetermined parameters is displayed in the display device 9 by the parameter display control unit 11. Accordingly, an operator can change values of the parameters based on the information displayed in the display device 9, and change the amplitude Q and the period R of oscillation of the rotation speed of the main spindle 2. Therefore, with this configuration, even if an operator is little experienced, the suppression of chatter vibrations can be achieved more effectively than with any existing machine tool, and thus the yields of machined products can be enhanced accordingly.

Moreover, since the amplitude Q and the period R are adopted as the predetermined parameters, or the angular acceleration of the main spindle 2, the torque of the main spindle 2, the amount of electric power supplied to the motor 4, or the rate of change is adopted in combination with one of the amplitude Q and the period R as the predetermined parameters, the amplitude Q and the period R can be changed with increased ease.

Furthermore, since a range of values of the predetermined parameters effective for suppressing regenerative chatter vibrations is displayed as information related to the parameters in the display device 9, even a little-experienced operator can more easily suppress chatter vibrations without fail.

Furthermore, in the present embodiment, a range of values of the predetermined parameters which would require a change of the amplitude Q and the period R involving an excessive load applied to the motor 4, and thus could not be put into practice (i.e., the range of values of the predetermined parameters according to which the torque of the main spindle 2 would exceed its maximum value) is displayed in the display device 9 as the information related to the predetermined parameters, to advise an operator that that range of values should not be inputted so that the torque of the main spindle 2 will not exceed the maximum value. Therefore, it is possible to prevent an undesirable situation in which an operator inputs a value requiring a torque of the main spindle 2 in excess of its maximum value, the input value becomes deemed invalid, and the machining operation proceeds without necessary changes which should be effected in the amplitude Q and the period R of oscillation of the rotation speed of the main spindle 2, with the result that the chatter vibrations cannot be suppressed. As a result, with this configuration, the chatter vibrations can be suppressed with great reliability.

Additionally, in this embodiment, the changed values of the parameters or the amplitude Q and the period R corresponding to the values of the parameters are stored in the storage unit 10, so that in the subsequent operation, from the beginning, the rotation speed of the main spindle 2 is caused to oscillate with the amplitude Q and the period R stored in the storage unit 10. Therefore, the chatter vibrations can be suppressed with a higher degree of reliability.

The machine tool to which the present invention is applicable is not limited to the above-described embodiment, and the rotary shaft, the parameter display control unit, the machine tool control unit, and the arrangement of the machine tool in its entirety can be modified appropriately on an as-needed basis, without departing the scope of the present invention.

For example, in the above-described embodiment, the machining center with a rotary shaft configured to allow a tool to be attached thereto has been described as a machine tool consistent with the present invention by way of example. However, any other type of machine tool, such as a lathe with a rotary shaft configured to allow a workpiece to be attached thereto so that the workpiece instead of the tool is to be rotated, may be implemented in accordance with the present invention.

In the above-described embodiment, the parameter display control unit 11 is configured to display the machining information as well as the parameter information in the display device 9. However, the machining information is not required to be displayed at all. The machining information may be displayed, separately from the parameter information displayed in the display device 9, that is, may be displayed in another display device.

In addition, in the above-described embodiment, ranges of values of the parameters which would require a change of the amplitude Q and the period R involving an excessive load applied to the motor 4 is only displayed in the display device 9. However, it is also possible to provide a machine tool configured to make it impossible to input such ranges of values of the parameters in the input device 12.

The invention claimed is:

1. A machine tool, comprising:
   a rotary shaft configured to allow a tool or a workpiece to be attached thereto;
   a driving unit connected to the rotary shaft to cause the rotary shaft to rotate;
   a rotary shaft control unit configured to regulate the driving unit to change a rotation speed of the rotary shaft in such a manner that the rotation speed oscillates with a given amplitude and a given period with reference to a given mean rotation speed;
   a machine tool control unit configured to allow predetermined parameters to be changed to thereby change at least one of the mean rotation speed, the amplitude and the period;
   a display device; and
   a parameter display control unit configured to cause the display device to display parameter information that is information related to the parameters, to allow the parameters to be changed based upon the parameter information displayed in the display device, wherein the parameter information displayed in the display device includes both of:
   a value or a range of values of a parameter effective against regenerative chatter vibrations; and
   a value or a range of values of a parameter ineffective against the regenerative chatter vibrations.

2. The machine tool according to claim 1, wherein the parameter information displayed in the display device includes:
   a range of values of a parameter according to which the driving unit is unable to be regulated.

3. The machine tool according to claim 1, wherein the predetermined parameters include the amplitude and the period.

4. The machine tool according to claim 1, wherein the predetermined parameters include:
   one of the amplitude and the period; and
   at least one of an angular acceleration of the rotary shaft, a torque of the rotary shaft, an amount of electric power supplied to the driving unit, a rate of change obtained by dividing the amplitude by the period, and the mean rotation speed.

5. A machine tool, comprising:
   a rotary shaft configured to allow a tool or a workpiece to be attached thereto;
   a driving unit connected to the rotary shaft to cause the rotary shaft to rotate;
   a rotary shaft control unit configured to regulate the driving unit to change a rotation speed of the rotary shaft in such a manner that the rotation speed oscillates with a given amplitude and a given period with reference to a given mean rotation speed;
   a machine tool control unit configured to allow predetermined parameters to be changed to thereby change at least one of the mean rotation speed, the amplitude and the period;
   a display device; and
   a parameter display control unit configured to calculate alternative values or ranges of values of parameters and cause the display device to display the alternative values and ranges of values of parameters that are information related to the predetermined parameters, to allow the predetermined parameters to be changed based upon the alternative values and ranges of values of parameters displayed in the display device, wherein the alternative values or ranges of values of parameters displayed in the display device include at least one of:
   a value or a range of values of a parameter effective against regenerative chatter vibrations; and
   a value or a range of values of a parameter ineffective against the regenerative chatter vibrations.

* * * * *